(12) United States Patent
Veeramasuneni et al.

(10) Patent No.: US 8,226,766 B2
(45) Date of Patent: Jul. 24, 2012

(54) SET ACCELERATOR FOR GYPSUM HYDRATION

(75) Inventors: Srinivas Veeramasuneni, Round Lake, IL (US); Qiang Yu, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/976,190

(22) Filed: Dec. 22, 2010

(65) Prior Publication Data

US 2012/0160133 A1 Jun. 28, 2012

(51) Int. Cl.
C04B 11/28 (2006.01)
C04B 11/00 (2006.01)
C04B 28/14 (2006.01)

(52) U.S. Cl. ........ 106/772; 106/690; 106/691; 106/775; 106/783; 264/333

(58) Field of Classification Search .................. 106/691, 106/775, 776, 778, 690, 772; 264/333
See application file for complete search history.

(56) References Cited

U.S. PATENT DOCUMENTS

| | | | |
|---|---|---|---|
| 1,829,746 A | 11/1931 | Harrison | |
| 2,987,407 A | 6/1961 | Ulfstedt | |
| 3,645,916 A | 2/1972 | Hall | |
| 4,082,563 A | 4/1978 | Ellis et al. | |
| 4,193,812 A | 3/1980 | Caspar et al. | |
| 4,234,345 A | 11/1980 | Fässle | |
| 4,376,831 A | 3/1983 | Woo | |
| 4,619,655 A | 10/1986 | Hanker et al. | |
| 4,801,355 A | 1/1989 | Johnstone et al. | |
| 5,462,722 A | 10/1995 | Liu et al. | |
| 5,569,325 A | 10/1996 | Barclay et al. | |
| 6,409,825 B1 | 6/2002 | Yu et al. | |
| 6,642,285 B1 | 11/2003 | Bohner | |
| 6,733,582 B1 * | 5/2004 | Bohner et al. | 106/690 |
| 6,765,153 B2 | 7/2004 | Goodson | |
| 7,150,879 B1 | 12/2006 | Lee et al. | |
| 7,252,841 B2 | 8/2007 | Constantz et al. | |
| 7,417,077 B2 * | 8/2008 | Lidgren et al. | 523/115 |
| 2007/0059281 A1 * | 3/2007 | Moseley et al. | 424/85.1 |
| 2007/0128248 A1 * | 6/2007 | Moseley et al. | 424/423 |

FOREIGN PATENT DOCUMENTS

| | | |
|---|---|---|
| EP | 2 353 619 A1 | 8/2011 |
| WO | WO 01/76649 A1 | 10/2001 |
| WO | WO 02/05861 A1 | 1/2002 |

OTHER PUBLICATIONS

Hina et al.: "Surface induced constant composition crystal growth kinetics studies. The brushite-gypsum system", Journal of Crystal Growth, vol. 223, 2008, pp. 213-224.
King et al.: "Effects of some orthophosphates on the hydration of calcium sulfate hemihydrate", Australian Journal of Chemistry, vol. 31(10), pp. 2295-2301.
Pinto et al.: "Oriented overgrowth of brushite (CaHPO42H2O) on gypsum(CaSO42H2O)", XXVII Reunión de la Sociedad Espanõla de la Mineralogía, macla 8, 2007, p. 1.
Rinaudo et al.: "The gypsum-brushite system: crystallization from solutions poisoned by phosphate ions", Journal of Crystal Growth, vol. 158, 1996, pp. 316-321.
Sakae et al: "The crystal structure of synthetic calcium phosphate-sulfate hydrate, Ca2HPO4SO4•4H2O, and its relation to brushite and gypsum", American Mineralogist, vol. 63 1978, pp. 520-527.

* cited by examiner

*Primary Examiner* — Anthony J Green
(74) *Attorney, Agent, or Firm* — Greer, Burns & Crain, Ltd.; David F. Janci, Esq.; Philip T. Petti, Esq.

(57) ABSTRACT

In a first embodiment of the invention, aged brushite is combined with calcium sulfate hemihydrate and water to make a gypsum slurry. Aged brushite slurry behaves similarly to calcium sulfate dihydrate to act as a seed crystal and rapidly initiate crystallization. The brushite slurry does not require the addition of a coating to maintain its activity over time compared to calcium sulfate dihydrate set accelerators. A gypsum-based product made using brushite slurry as the set accelerator is a second embodiment. The product has the brushite molecules integrated as part of the calcium sulfate dihydrate matrix and is distributed throughout the matrix.

9 Claims, No Drawings

SET ACCELERATOR FOR GYPSUM HYDRATION

BACKGROUND OF THE INVENTION

This invention relates to a set accelerator for gypsum hydration. More specifically, it relates to a set accelerator that reduces the initial induction period that delays setting of gypsum.

Freshly mined gypsum is known as landplaster. It is an ore that includes calcium sulfate dihydrate, also known as gypsum, plaster or terra alba. In many deposits, landplaster includes at least 50% by weight calcium sulfate dihydrate. The calcium sulfate dihydrate is calcined at temperatures above 150° C. to drive off part of the water of hydration, forming calcium sulfate hemihydrate, also known as calcined gypsum, stucco, Plaster of Paris, calcium sulfate semihydrate or calcium sulfate half-hydrate. When added to water, calcium sulfate hemihydrate crystallizes with the water to reform the dihydrate. As the reaction proceeds, an interwoven matrix of calcium sulfate dihydrate crystals forms and becomes hard. The reaction is represented by the formula:

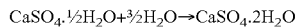

$$CaSO_4 \cdot \tfrac{1}{2}H_2O + \tfrac{3}{2}H_2O \rightarrow CaSO_4 \cdot 2H_2O$$

Many substances are known to accelerate the hydration rate of calcium sulfate hemihydrate hydration. Set time is determined by one of two mechanisms. There is an initial delay or induction period while a few "starter" crystals are formed. After this induction period, the rate of reaction increases to a standard rate. Most set accelerators increase the hydration rate. For example, most sulfate compounds act as set accelerators according to LeChatlier's principle. Few substances are known to reduce the induction period. The most well-known of these is calcium sulfate dihydrate.

Mined, unground landplaster is ineffective as a set accelerator for hydration reactions. Grinding calcium sulfate dihydrate exposes fresh nucleation sites that speed formation of the dihydrate gypsum. Exposure to humidity deactivates the nucleation sites in as little as a few hours. To preserve the active surfaces, it is known to treat ground calcium sulfate dihydrate with a starch, such as sugar, to prevent oxidation. When added to a slurry of calcined gypsum and water, the starch quickly dissolves and exposes the active crystal sites. The active crystal sites act as "seed" crystals that facilitate formation of calcium sulfate dihydrate crystals in an interlocking matrix. Examples of coated calcium sulfate are HRA and CSA, described in U.S. Pat. Nos. 2,078,199 and 3,573,947, respectively, both of which are herein incorporated by reference in their entirety.

Another known accelerator is described in U.S. Pat. No. 6,409,825, herein incorporated by reference. This accelerator includes ground calcium sulfate dihydrate in water with at least one additive selected from the group consisting of an organic phosphonic compound, a phosphate-containing compound or mixtures thereof. As with CSA and HRA, the gypsum particles act to accelerate the initial crystallization during the hydration reactions. This particular accelerator exhibits substantial longevity and maintains its effectiveness over time such that the wet gypsum accelerator can be made, stored, and even transported weeks or months after its manufacture. The wet gypsum accelerator is used in amounts ranging from about 5 to about 80 pounds per thousand square feet (24.3 to 390 g/m²) of board product.

SUMMARY OF THE INVENTION

In a first embodiment of the invention, a brushite slurry or paste is combined with calcium sulfate hemihydrate and water to make a gypsum slurry. The brushite behaves similarly to calcium sulfate dihydrate in that it acts as a seed crystal and rapidly initiates crystallization. Surprisingly, it has been found that the brushite slurry does not degrade with time or exposure to humidity as does calcium sulfate dihydrate. Thus, the brushite does not require the addition of a coating to maintain its activity over time compared to calcium sulfate dihydrate set accelerators.

Another surprising result of this invention is that the brushite in slurry form acts as a set accelerator. Generally, phosphates and phosphonates are known as strong set retarders for gypsum hydration reactions. Dry, powdered brushite does not act as a set accelerator. It was not expected that a brushite slurry would be such an effective set accelerator.

This set accelerator also differs from other particulate set accelerators in that no additional additives are needed either to initiate or to maintain efficacy of the product. Once in the form of an aqueous paste or slurry, activity of the brushite slurry is maintained for weeks. This reduces the cost of the set accelerator compared to other known solid accelerators that require additives.

A gypsum-based product made using wet brushite as the set accelerator is a second embodiment. The product has the brushite molecules integrated as part of the calcium sulfate dihydrate matrix and is distributed throughout the matrix. Where coated calcium sulfate dihydrate is used as the seeding agent, a residue of the added starch is present in the product. No additives are used with the brushite, making a gypsum product with fewer interruptions in the crystal matrix.

A method of making the brushite-containing slurry is a third embodiment of this invention. The method includes grinding brushite in water. The wet brushite is combined with calcium sulfate hemihydrate and water to form a gypsum slurry. A product is formed from the gypsum slurry and allowed to set. Comparable set acceleration is obtained without the step of co-grinding the solid brushite with a starch or forming a coating therewith. Brushite is useful in products were other solid set accelerators are used.

DETAILED DESCRIPTION OF THE INVENTION

One principal component of the gypsum slurry is calcium sulfate hemihydrate. Calcium sulfate hemihydrate produces at least two crystal forms depending on the method of calcination. Alpha-calcined gypsum is made by a continuous process or lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology allows water to flow easily between the crystals, requiring less water to form a flowable gypsum slurry. More elongated crystals are characteristic of the beta-calcined gypsum. This crystal structure results in a less dense product because the crystals are more loosely packed. The beta form also requires more water to fluidize the calcined gypsum. In applications where hardness is important, alpha-calcined gypsum is usually preferred, despite higher cost and limited availability.

When choosing a calcined gypsum for an application, beta-calcined gypsum is often selected due to its ready availability and its reduced cost. Because beta-calcined gypsum is also more common, it can incur reduced shipping and storage costs than the alpha form. However, the crystal structure makes it difficult to make a strong, dense gypsum because more water is needed to produce a gypsum slurry of a given fluidity. When the gypsum is dry, voids once occupied by water remain in the crystal matrix, weakening it and producing a product having less strength than gypsum made with smaller amounts of water. Choice of the crystal form depends on the end use of the gypsum slurry. A low water gypsum slurry, such as that obtained with an alpha-calcined gypsum, is particularly useful in an application such as a poured floor, where strength is important. Where product cost must be minimized, beta-calcined gypsum is often selected. The presence of calcium sulfate anhydride as a minor part of the calcium sulfate hemihydrate is also contemplated with this invention.

Yet another crystal form that is useful is synthetic gypsum. Synthetic gypsum is a by-product of flue gas desulphurization in coal-fired power plants. It can be used interchangeably with natural rock gypsum in some applications. Unless otherwise specified, reference to "calcium sulfate hemihydrate" is intended to include alpha-calcined gypsum, beta-calcined gypsum, synthetic gypsum, calcium sulfate anhydrate or combinations thereof.

The calcium sulfate hemihydrate makes up at from about 50% to about 99% of the dry components by weight in the gypsum slurry. In some embodiments, calcium sulfate hemihydrate is from about 70% to about 98% by the weight of the dry components.

Another component of the gypsum slurry is a brushite slurry. Brushite is a calcium hydrophosphate ($CaHPO_4 \cdot 2H_2O$), a naturally occurring mineral also known as dicalcium phosphate dihydrate. Wet brushite has been found to be useful as a set accelerator in gypsum slurries. Whereas most set accelerators increase the reaction rate once the reaction has begun, wet brushite in the form of a paste or slurry acts to reduce the induction time, which is the time between catalyst addition and the time a noticeable reaction starts to take place. In the case of calcined gypsum, hydration is an exothermic reaction. The extent of the hydration reaction is frequently measured in terms of the temperature rise of the gypsum slurry. Temperature of the gypsum slurry begins to rise faster when a brushite slurry is used as the set accelerator. While not wishing to be bound by theory, it is believed that the brushite slurry acts to form seed crystals for formation of the calcium sulfate dihydrate. In the set product, the brushite crystal and the water that carried it become an integral part of the calcium sulfate dihydrate crystal matrix distributed throughout the product.

Unlike other solid accelerators, the brushite slurry does not lose potency over time. Active sites on the brushite crystal that catalyze the hydration of calcined gypsum do not deteriorate over periods of weeks. Aged brushite in a slurry has been found to be as effective as a slurry of freshly ground brushite without treating. Brushite slurry that has been aged more than 24 hours is more advantageous than calcium sulfate dihydrate as it requires no coating or additive to maintain its ability to form seed crystals.

The wet brushite accelerator is prepared by wet grinding brushite by any suitable method. In some embodiments, the ground brushite has a particle size less than 40 microns. It is ground, if necessary, to achieve a particle size of about 1 micron to about 20 microns. A preferred method of grinding is in a ball mill. The grinding medium (balls) are larger and more dense than the starting brushite particles for optimum grinding. In one embodiment, 50 grams of brushite is ground with 34 balls in the presence of 60 cc of water. A satisfactory brushite paste is obtained in 45 minutes.

Relative amounts of water and brushite can be any suitable ratio. When wet grinding is used, the amount of water is sufficient to allow the wet grinding to occur. Water in excess of that needed for grinding should be minimized to reduce the cost of storing and transporting the accelerator. In some preferred embodiments, the ground brushite forms a paste or thick slurry. Inclusion of excess water does not affect the efficacy of the product, so a less viscous accelerator can be produced where the bulk or weight of the water is not an issue. Some embodiments utilize water in amounts of at least 40% by weight of the brushite slurry.

The brushite slurry is used to catalyze hydration of a gypsum slurry in amounts to provide about 0.015% to about 2% dry brushite based on the weight of the dry calcium sulfate hemihydrate. In some embodiments, the brushite slurry is used in amounts of about 0.1% to about 1% on the same basis. The exact amount to be selected depends on several factors. The calcined gypsum source affects the set rate as some impurities act as set accelerators or retarders. Process conditions must also be considered when choosing the amount of a set accelerator. In the manufacture of gypsum board products, the amount of set accelerator is selected to produce a target degree of set at the cutting knife. On a high speed manufacturing line, the wallboard product is, for example, between 40% and 45% set at the knife. The product may be as much as 60% set at the knife on a low speed unit. If the gypsum slurry has too much accelerator, crystallization of the dihydrate in mixing equipment can result. Too little accelerator leads to slowing of the production line so that the product is sufficiently set to be handled or cut. The amounts of set accelerators or set retarders may need to be adjusted to balance these factors.

It is also contemplated that the brushite slurry be used in combination with other set accelerators. Since brushite reduces the induction period, in some embodiments it is used with set accelerators that increase the hydration rate, thus speeding up both aspects of the reaction mechanism. Many set accelerators are known to influence the rate of the hydration reaction. These accelerators include, but are not limited to, acids, sulfate compounds, including aluminum sulfate, potash and sodium bisulfate, and the like. Other embodiments of the invention combine the brushite slurry with other compounds that reduce the induction period. As discussed above, calcium sulfate dihydrate, also known as landplaster, is well-known as a set accelerator. Freshly ground landplaster is useful as an additional accelerator, as well as ground landplaster coated with sugar or other starch or the wet gypsum accelerator described above.

A gypsum slurry is prepared by combining the brushite slurry, calcium sulfate hemihydrate and water. Although the brushite will be most effective when the brushite slurry and the calcined gypsum are added at the same time, the brushite slurry can be added at almost any point from before the calcined gypsum is added to the gauging water until after the gypsum slurry is discharged from the mixer. Prior to preparation of the gypsum slurry, the brushite slurry is frequently combined with other wet ingredients to form a dry component mixture. In order to show a noticeable set acceleration, the brushite slurry is added to the gypsum slurry before the induction period for the hydration reaction is complete. For example, it can be added to the process water prior to, simultaneously with or after the addition of other product components. Brushite slurry is alternately added to the gypsum slurry separately from other ingredients. In gypsum panel manufacture, it is desirable to have the product 50% set at the knife where the panels are cut. The place of brushite addition is optionally used to control the extent of reaction. The amount of set accelerator can also be increased or decreased to achieve the desired degree of set.

Other dry additive components are selected depending on the nature of the desired product. In many cases, it is not necessary to thoroughly blend the dry ingredients. Addition of measured dry ingredients, such as with a bag dump, is sufficient to endure that the dry ingredients are all exposed to the water at substantially the same time.

The gypsum slurry is made into a product by any means known in the art. For flooring, the gypsum slurry is poured directly into a prepared area where the flooring is desired. Structural panels are made by pouring the gypsum slurry onto a facing material, by casting the gypsum slurry or by felting a mixture of the gypsum slurry and fibers. In all products made with the gypsum slurry, the brushite is incorporated into the interlocking matrix of gypsum particles and distributed throughout the product.

In the examples below, aggregated two-inch cube samples were tested for density and compressive strength. Cube molds were prepared by sealing the bottom of the mold with petroleum jelly to prevent leaking and lubricating the molds with an approved release agent, such as WD-40. Sample material was poured into the corner of the cubes until they were approximately ¾ full. Using a small spatula, the sample material was vigorously agitated from corner to corner for 3-5 seconds, eliminating all bubbles in the cube.

The cubes were then filled to slightly overfull, and the remaining sample material poured into the set cup for additional testing. Excess sample was screeded from the cube molds 10 minutes after Vicat set and the cubes were carefully removed from the molds. They were placed in a 110° F. (43° C.) forced air oven overnight or until constant weight was achieved. Density of the samples was determined by weighing a number of dried cubes and applying the following formula:

Density (lb/ft$^3$)=(Weight of cubes*0.47598)÷number of cubes

Aggregated cubes were used to test for compressive strength using a compressive strength testing machine. Cubes were placed between two platens. Force was applied to the cube as the platens were pushed together. The machine recorded the pounds of force that were required to crush the cube. Total force in pounds was converted to pounds per square inch (psi) by dividing by the surface area of the sample, in this case 4 in$^2$.

Example 1

Set acceleration of the DCPDH was studied using a temperature rise study. When the set acceleration to form the dihydrate crystal matrix occurs, the temperature of the gypsum slurry rises due to generation of heat during crystallization. Temperatures are reported in ° C. (° F.). Rate of the exothermic reaction of DCPDH in the gypsum slurry of Example 1 was determined using the Temperature Rise System (TRS). The TRS unit is an electronic thermoster that measured the heat evolved from the exothermic reaction of hydration of calcium sulfate hemihydrate to calcium sulfate dihydrate. Each sample contained 250 grams of the gypsum slurry that had been soaked 10 seconds and handmixed for 10 seconds. The thermoster was placed into a cup where the slurry had been poured. This cup was placed in a quasi-temperature stable environment (Styrofoam container). Temperature data was collected by a computerized data acquisition system. The data collected is set forth in Table 2, below:

TABLE 2

Temperature Rise of Solid Set Accelerators

| Time | CSA | HRA | Fresh DCPDH | Aged DCPDH |
|---|---|---|---|---|
| 0.2 | 24.0 (75.2) | 24.0 (75.2) | 23.7 (74.6) | 23.0 (73.4) |
| 0.3 | 23.9 (75.1) | 24.1 (75.4) | 23.8 (74.8) | 23.5 (74.3) |
| 0.4 | 24.0 (75.2) | 24.2 (75.6) | 23.8 (74.9) | 23.7 (74.7) |
| 0.5 | 24.1 (75.3) | 24.3 (75.8) | 23.9 (75.1) | 24.0 (75.2) |
| 0.6 | 24.1 (75.4) | 24.4 (76.0) | 24.0 (75.2) | 24.1 (75.3) |
| 0.7 | 24.2 (75.5) | 24.5 (76.1) | 24.1 (75.3) | 24.2 (75.5) |
| 0.8 | 24.2 (75.5) | 24.6 (76.3) | 24.1 (75.4) | 24.3 (75.7) |
| 0.9 | 24.3 (75.7) | 24.7 (76.5) | 24.2 (75.6) | 24.4 (76.0) |
| 1.0 | 24.3 (75.8) | 24.8 (76.7) | 24.3 (75.8) | 24.5 (76.1) |
| 1.1 | 24.4 (75.9) | 24.9 (76.9) | 24.4 (75.9) | 24.6 (76.3) |
| 1.2 | 24.4 (76.0) | 25.0 (77.0) | 24.4 (76.0) | 24.7 (76.5) |
| 1.3 | 24.5 (76.1) | 25.1 (77.2) | 24.6 (76.2) | 24.8 (76.6) |
| 1.4 | 24.6 (76.3) | 25.3 (77.6) | 24.7 (76.5) | 24.9 (76.9) |
| 1.5 | 24.7 (76.5) | 24.4 (77.8) | 24.8 (76.7) | 25.1 (77.1) |
| 1.6 | 24.8 (76.6) | 25.6 (78.0) | 24.9 (76.8) | 25.3 (77.3) |
| 1.7 | 24.8 (76.7) | 25.7 (78.2) | 25.0 (77.0) | 25.3 (77.5) |
| 1.8 | 24.9 (76.9) | 25.8 (78.5) | 25.1 (77.2) | 25.4 (77.7) |
| 1.9 | 25.1 (77.2) | 26.1 (79.0) | 25.3 (77.6) | 25.6 (78.1) |
| 2.0 | 25.2 (77.4) | 26.2 (79.2) | 24.4 (77.8) | 25.7 (78.3) |
| 2.1 | 25.3 (77.5) | 26.4 (79.5) | 25.6 (78.1) | 25.8 (78.5) |
| 2.2 | 25.4 (77.7) | 26.6 (79.8) | 25.7 (78.3) | 26.0 (78.8) |
| 2.3 | 25.6 (78.1) | 26.9 (80.5) | 26.0 (78.8) | 26.3 (79.3) |
| 2.4 | 25.7 (78.3) | 26.9 (80.5) | 26.1 (79.0) | 26.4 (79.6) |

This table demonstrates the initial temperature rise that is obtained with brushite slurry as the set accelerator. Compared to CSA or HRA, brushite provides a similar temperature rise profile. This is evidence that the DCPDH (brushite) accelerates the hydration reactions by the same mechanism, that is, by formation of seed crystals and reduction of the induction period.

Activity of freshly ground brushite (Fresh DCPDH) and a brushite slurry that was ground more than 48 hours after preparation (Aged DCPDH) are also compared. There are no significant differences in the temperature rise profiles of the fresh and aged brushite slurries. However, it is commonly known that aged landplaster looses its efficacy as a set accelerator.

Example 2

CSA and HRA were prepared with a 5 wt. % sugar coating as described above. Ground dicalcium phosphate dihydrate ("DCPDH") was prepared by grinding 50 grams of dicalcium phosphate dihydrate with 60 cc of water in a ball mill with 34 balls for 45 minutes. The ground DCPDH had no protective coating. Samples of 500 grams of Detroit stucco were combined with the set accelerators shown in Table 1 and 700 grams of water to form a gypsum slurry. The amount of brushite slurry in Formula 3 was chosen to include 2.5 grams of solids in the gypsum slurry. Three samples for each composition were prepared and tested. Each sample is reported in the table below, together with the average values for each sample.

TABLE I

| Formula | Accelerator | Dry Weight, kg (lbs) | Density, kg/cc (lb/in$^3$) | Compressive Strength, MPa (psi) |
|---|---|---|---|---|
| 1 | 2.5 grams Detroit HRA | 39.8 (87.8) | 1.16 (41.8) | 7.11 (1032) |
|  |  | 39.9 (88.0) | 1.16 (41.9) | 7.31 (1060) |
|  |  | 39.9 (88.0) | 1.16 (41.9) | 7.29 (1058) |
| average |  | 39.9 (88.0) | 1.16 (41.9) | 7.24 (1050) |
| 2 | 2.5 grams Southard CSA | 39.5 (87.0) | 1.15 (41.4) | 6.83 (991) |

TABLE I-continued

| Formula | Accelerator | Dry Weight, kg (lbs) | Density, kg/cc (lb/in³) | Compressive Strength, MPa (psi) |
|---|---|---|---|---|
| | | 39.7 (87.6) | 1.15 (41.7) | 6.40 (928) |
| | | 39.4 (86.9) | 1.15 (41.4) | 6.76 (981) |
| average | | 39.6 (87.2) | 1.15 (41.5) | 6.67 (967) |
| 3 | 5.5 grams DCPDH | 39.3 (86.6) | 1.14 (41.2) | 7.08 (1027) |
| | | 39.5 (87.1) | 1.15 (41.4) | 7.07 (1026) |
| | | 39.3 (86.6) | 1.14 (41.2) | 7.07 (1026) |
| average | | 39.4 (86.8) | 1.14 (41.3) | 7.07 (1026) |
| 4 | 11 grams DCPDH | 39.3 (86.6) | 1.14 (41.2) | 7.16 (1039) |
| | | 39.3 (86.7) | 1.14 (41.3) | 7.07 (1026) |
| | | 39.3 (86.6) | 1.14 (41.2) | 7.14 (1036) |
| average | | 39.9 (86.6) | 1.14 (41.2) | 7.13 (1034) |

This example shows that the compressive strength of the product made with DCPDH is comparable to that of the CSA or HRA coated landplasters.

While a particular embodiment of the set accelerator for gypsum hydration has been shown and described, it will be appreciated by those skilled in the art that changes and modifications may be made thereto without departing from the invention in its broader aspects and as set forth in the following claims.

What is claimed is:

1. A gypsum product comprising:
    a matrix of calcium sulfate dihydrate crystals with
    ground brushite crystals distributed throughout said matrix, wherein said ground brushite crystals are present in amounts of about 0.013% to about 1.7% by weight of the ground brushite by weight of the calcium sulfate dihydrate.

2. The gypsum product of claim 1 wherein said ground brushite is uncoated.

3. The gypsum product of claim 1 wherein said ground brushite has a particle size distribution of about 1 micron to about 20 microns.

4. The product of claim 1 wherein said ground brushite is aged in a slurry with water more than 48 hours after grinding.

5. A method of making a gypsum article comprising:
    obtaining calcium sulfate hemihydrate;
    obtaining a slurry of ground brushite, wherein said ground brushite is present in amounts of about 0.015% to about 2% by weight dry ground brushite by weight of the dry calcium sulfate hemihydrate;
    mixing the brushite slurry, calcium sulfate hemihydrate and water to form a gypsum slurry;
    forming a product from said gypsum slurry; and
    allowing the gypsum slurry to set.

6. The method of claim 5 further comprising aging said slurry of ground brushite to form an aged brushite slurry prior to said mixing step.

7. The method of claim 5 wherein said ground brushite of said obtaining step has a particle size of less than about 40 microns.

8. The method of claim 7 wherein said ground brushite of said obtaining step has a particle size of about 1 micron to about 20 microns.

9. The method of claim 5 wherein said forming step comprises depositing said gypsum slurry on a facing and shaping the gypsum slurry to form a panel.

* * * * *